United States Patent
Trischberger et al.

(10) Patent No.: US 8,474,291 B2
(45) Date of Patent: Jul. 2, 2013

(54) LOCKING DEVICE WITH ARRESTING PART

(75) Inventors: Werner Trischberger, Langenpettenbach (DE); Kenjirou Hayashi, Bunkyou Sagamihara (JP); Yoshio Watanuki, Ebina (JP)

(73) Assignees: Huf Hulsbeck & Furst GmbH Co. KG (DE); Nissan Motor Co., Ltd. (JP)

( * ) Notice: Subject to any disclaimer, the term of this patent is extended or adjusted under 35 U.S.C. 154(b) by 811 days.

(21) Appl. No.: 12/176,549

(22) Filed: Jul. 21, 2008

(65) Prior Publication Data

US 2009/0064739 A1 Mar. 12, 2009

(30) Foreign Application Priority Data

Jul. 20, 2007 (DE) .......................... 10 2007 034 481

(51) Int. Cl.
*B60R 25/02* (2006.01)
(52) U.S. Cl.
USPC .............................................. 70/186; 70/252
(58) Field of Classification Search
USPC ........................................... 70/182–186, 252
See application file for complete search history.

(56) References Cited

U.S. PATENT DOCUMENTS

| | | | |
|---|---|---|---|
| 6,295,848 B1 * | 10/2001 | Suzuki | 70/186 |
| 6,349,579 B1 * | 2/2002 | Canard | 70/186 |
| 6,354,117 B1 * | 3/2002 | Canard | 70/186 |
| 6,439,011 B1 | 8/2002 | Frick et al. | |
| 6,516,640 B2 * | 2/2003 | Jacobs et al. | 70/186 |
| 6,915,671 B2 * | 7/2005 | Zillmann | 70/186 |
| 7,007,525 B2 * | 3/2006 | Okuno et al. | 70/186 |
| 7,055,351 B2 * | 6/2006 | Suzuki et al. | 70/186 |
| 7,104,097 B2 * | 9/2006 | Zillmann | 70/186 |
| 7,121,126 B2 | 10/2006 | Zillmann | |
| 8,033,148 B2 * | 10/2011 | Okada et al. | 70/186 |
| 2005/0166650 A1 * | 8/2005 | Shimura et al. | 70/252 |
| 2006/0005588 A1 * | 1/2006 | Okuno | 70/186 |
| 2009/0266122 A1 * | 10/2009 | Okada et al. | 70/252 |
| 2010/0064742 A1 * | 3/2010 | Okada et al. | 70/185 |
| 2010/0192649 A1 * | 8/2010 | Nakamoto | 70/353 |
| 2011/0167885 A1 * | 7/2011 | Sugimoto | 70/186 |

FOREIGN PATENT DOCUMENTS

| | | |
|---|---|---|
| DE | 10041984 | 4/2002 |
| DE | 10247803 | 1/2004 |
| DE | 10356660 A1 | 7/2005 |
| EP | 0953487 | 11/1999 |

(Continued)

OTHER PUBLICATIONS

International Search Report issued Mar. 16, 2010 by the European Patent Office re: EP 08160776.4; pp. 5; citing: EP 1 167 135 A1 and DE 103 56 660 A1.

*Primary Examiner* — Suzanne Barrett
(74) *Attorney, Agent, or Firm* — Cantor Colburn LLP (57) ABSTRACT

The invention relates to a locking device for the locking and/or unlocking of a component essential for the function of a vehicle with a casing, which more preferably serves for the fastening of the locking device to the component essential for the function and a moveable locking member, which can assume at least two positions, namely a locking position, in which the locking member protrudes from the casing through an opening and is actively connected with the component essentially for the function and an unlocking position, in which the locking member is not actively connected with the component essential for the function and an arresting part which in an arresting position arrests the locking member in the locking position in the event that the locking device is opened without authorization.
To this end it is provided according to the invention that the arresting part is positively held in the arresting position.

40 Claims, 8 Drawing Sheets

FOREIGN PATENT DOCUMENTS

| | | |
|---|---|---|
| EP | 0989038 | 3/2000 |
| EP | 1167135 | 1/2002 |
| EP | 1182104 | 2/2002 |
| EP | 1688327 | 8/2006 |
| EP | 1953048 | 8/2008 |
| GB | 2257676 A * | 1/1993 |
| JP | 11310104 | 11/1999 |
| JP | 2004 231122 | 8/2004 |
| WO | 2008/009564 | 1/2008 |

* cited by examiner

LOCKING DEVICE WITH ARRESTING PART

TECHNICAL FIELD OF THE INVENTION

The present invention relates to a locking device for the locking and/or unlocking of a component essential for functioning, more preferably of a steering column or a gear shift lever or such like of a vehicle. Such locking devices serve to secure the vehicle against theft in that they lock the component essential for the function in the secured state by means of a movable locking member in a positive and/or non-positive way. Because of this, securing of the vehicle against theft and/or unauthorized utilization takes place. The locking member itself can be driven or activated directly or indirectly via a mechanism, a motor or a magnet. What is more, the present invention is not directed at a particular drive of the locking member.

BRIEF SUMMARY OF RELATED ART

Patent publication EP 1 182 104 B1 is known from the prior art where a locking device is disclosed in which the locking member can be secured by way of an additional safety pin if the casing of the locking device is opened by force. Here, the safety pin is pushed into a recess of the locking member by means of a spring force to positively stop the locking member. In this position, the safety pin is not further secured so that the positive protection of the locking member can be overcome through lateral sudden blows on the locking device. On the whole, the known locking device has a complex and expensive structure.

BRIEF SUMMARY OF THE INVENTION

The invention creates a locking device for the locking and/or unlocking of a component essential for the function of a vehicle which is developed particularly secure, more preferably against breaking-open attempts.

With the present locking device the existing locking member is arrested via an arresting part in the event that the locking device is opened without authorization or by force. By this is meant that an attempt is made from the outside by unauthorized third parties to get into the locking device or into the casing interior to bring about manipulation and unlocking of the locking member in this way. The mentioned locking member of the locking device itself can assume at least two positions, namely a locking position, in which the locking member protrudes from the casing of the locking device through an opening and is actively connected with the component essential for the function, and an unlocking position, in which the mentioned locking member is not actively connected with the component essential for the function so that it can be utilized according to the function. In this way the locking member for example locks a steering column or a gearshift lever or such like which serve as components essential for the function in the vehicle in order to prevent utilization or theft of the vehicle. In contrast with this, for example, the steering column can be freely used in the unlocking position of the locking member so that the vehicle is ready for driving. If attempts from the outside are now made by unauthorized third parties to open the locking device, final arresting of the locking member in its locking position takes place. To this end, the arresting part assumes its arresting position. According to the invention, the arresting part is held positively (form closed) in the arresting position so that external effects (of force) on the locking device are not sufficient to cancel the positive connection of the arresting part. Through this measure, external influences (such as blows and/or jerking) cannot overcome the securing effect of the locking device so that the component essential for the function remains unutilisably locked. The arresting part itself can be held directly or indirectly positively in the arresting position. Provided it is held indirectly in the arresting position an additional component or element is used through which the positive connection is effected.

With a particular development of the device according to the invention it is provided that the arresting part directly interacts mechanically with the locking member. Consequently the locking member is directly held in the locking position in a non-displaceable way by the arresting part. It is also conceivable that the arresting part of the locking member is held indirectly more preferably by way of a control element which actuates the locking member. Thus, the arresting part does not act directly but indirectly via an additional element, more preferably through the control element, on the locking member. With both embodiments, i.e. the direct and indirect securing of the locking member the arresting part with its counterpart can enter into a positive connection and/or preferably a non-positive connection to arrest the locking member in the locking position. To this end, the arresting part itself assumes its arresting position.

With a further practical development of the invention it is provided that the arresting part is accommodated in an encapsulated way in the casing of the locking device so that the arresting part can no longer be moved out of the arresting position from the outside. It is rather that the locking device has to be completely destroyed in order to bring about, following forceful opening of the locking device, the locking position of the locking member and thus the release of the component essential for the function. In order to accommodate the arresting part in the casing in an encapsulated way an additional bearing element can be provided in which the arresting part is held displaceably. Thus, the arresting part is quasi arranged in a separate inner casing within the locking device wherein the bearing element can constitute a part of the inner casing. In this context it is likewise conceivable that at least a part or a side of the bearing element is a one-piece development with the casing of the locking device. To guarantee high breaking-in security, the arresting part and the bearing element and the casing of the locking device can consist of a light metal or die-casting alloy, more preferably an aluminium die-casting alloy. Since during a breaking-in attempt the forces do not act on the arresting part directly but rather on the locked component essential for the function and on the locking member, the arresting part itself can for instance also consist of an injection moulded plastic part and/or a glass fibre reinforced plastic part.

With a particular exemplary embodiment of the locking device according to the invention the locking device has at least an element partly accessible from the outside, more preferably in form of a locking cylinder, a casing lid, a casing half or a connection contact. This element accessible from the outside prevents the unwanted or unauthorized intervention in the casing interior of the locking device through which manipulations are successfully prevented. Unauthorised opening of the locking device through removal of the element accessible from the outside results, according to the invention, in that the arresting part assumes its arresting position, through which the locking member is held in the locking position. The previously mentioned accessible element as a rule serves to isolate the casing of the locking device from external influences or grant defined access to the locking device such as through a key or an electrical connection.

The locking device is constructed such that disassembly of the casing from the component essential for the function or removal of the component accessible from the outside is only possible when the locking member dwells in the unlocking position. In this unlocking position, the casing can also be opened by taking off or removing the element accessible from the outside without transferring the arresting part into its arresting position. In this case the arresting part is held in a release position through the locking member or by way of the control element. Even the locking of the casing of the locking device through the element accessible from the outside is only possible in the unlocking position of the locking member.

With the exemplary embodiment mentioned before a safety part can be additionally provided which is provided between and mechanically interacts with the element accessible from the outside and the arresting part, wherein the accessible element holds the safety part in a position of rest provided the accessible element locks the casing interior and the safety part in the position of rest holds the arresting part in a release position in which the locking member is arranged moveably in the casing. Unauthorised removing of the element accessible from the outside results in that the safety part is transferred from the position of rest to a safety-off position, through which the arresting part changes from the release position to the arresting position, upon which the locking member is finally arrested in the locking position. The mentioned safety part can for example be screwed to the component accessible from the outside. It is likewise conceivable that the safety part is permanently connected with the accessible element by way of a rivet connection or welded connection. The safety part can also be connected with the accessible element by way of a clamping connection. The safety part at one end has a fastening area with which it is connected to the element accessible from the outside. At the opposite end of the fastening area a function area of the safety part is arranged. This function area is actively connected with the arresting part. In a conceivable development of the invention the safety part in its position of rest holds the arresting part with the function area positively in the release position. Through the improper removal of the element accessible from the outside the safety part, more preferably with the function area, is removed from the arresting part, through which the positive connection between the safety part and the arresting part is cancelled. Through the improper opening of the casing of the locking device or the removal of the element accessible from the outside the safety part changes from its position of rest to the safety-off position, through which the arresting part is transferred into its arresting position. The corresponding safety part can be designed as a plate part, more preferably a punched plate part. It is likewise conceivable that the safety part predominantly consists of a safety wire which has a solid tip for the function area in order to be able to hold the arresting part positively in the release position. It is likewise conceivable that the arresting part is held non-positively and/or positively in the release position by the safety part. With a non-positive fastening of the arresting part the safety part can for example clamp-in the arresting part. As described before it is practical that the arresting part is arranged in an encapsulated way within the casing of the locking device in order to keep the arresting part free of external influences in this way. Only the safety part protrudes through the encapsulation in the position of rest, for which a break-through for instance in form of a slot, gap or a bore can be provided for the safety part. Once the arresting part has been transferred to its arresting position it is practical that access to the arresting part through the break-through mentioned before is avoided. For this purpose the arresting part is held in the arresting position removed from the break-through.

With a practical development of the locking device according to the invention it is provided that a spring force acts on the arresting part which originates from a spring element, through which an independent change from the release position to the arresting position takes place for the arresting part in the event that the casing is opened without authorization. Here, the spring force serves to displace the arresting part from the release position to the arresting position. A coil spring or a leg spring can be used for this for example.

Provided that the last mentioned leg spring is employed the arresting part can be held positively in the arresting position by way of the leg spring wherein a part of the spring is positively held in this position behind a shoulder, more preferably of the bearing element or the casing of the locking device. Thus, the mentioned part of the spring serves as means of locking once it has slipped over the shoulder and is positively held behind the shoulder. Thus, the arresting part can no longer be transferred from the arresting position to the release position either.

It is further conceivable that the arresting part and the spring, more preferably in form of a leg spring, are designed as one piece. Consequently the arresting part with the spring forms only one component, which can be of uniform material design. Through this combined arresting part (arresting part and spring) an independent change from the release position to the arresting position can be achieved. Practically, the combined arresting part is designed as a specially shaped leg spring which has a first and a second leg. With the first leg the special leg spring can for example brace itself on the bearing element or the casing, in order to generate the necessary bracing force for second leg in this way. The second leg serves for the positive arresting of the locking member, for the purpose of which the second leg for example can have an arc-shaped protrusion which positively interacts with a shoulder or a depression in the locking member, provided the second leg is in the arresting position. This mentioned protrusion can also be realized through a cam or the like which is arranged on the second leg of the leg spring. In addition, the second leg of the combined arresting part can have an offset end, which is suitable to hold the combined arresting part in the release position, in that the already mentioned safety part, more preferably with its operating region or a tip, positively and/or non-positively interacts with the offset end of the second leg. If the safety part is now removed the offset end of the second leg is no longer held by the safety part, more preferably the operating region or the tip, so that the second leg automatically changes from the release position to the arresting position.

In addition or optionally for example on the bearing element or on the casing interior, a protrusion can be provided which fixes the combined arresting part, more preferably the second leg, positively in the arresting position. To this end, the previously mentioned protrusion can have a sliding and a holding region, wherein the sliding region serves to ensure that the second leg of the combined arresting part is able to slide effortlessly over the protrusion, whereas the following holding region serves for the purpose of positively securing the second leg in the arresting position. To this end, the protrusion can for example be designed wedge-like, wherein the surface of the wedge-shaped protrusion which is oriented in an inclined manner constitutes the sliding region and the vertically dropping and following surface of the wedge-shaped protrusion forms the holding region.

With a special embodiment of the combined arresting part it is additionally conceivable that the first leg is designed such that it positively and/or non-positively holds the second leg of the combined arresting part in its release position. To this end, the first leg can comprise an offset end, wherein in addition a recess can be provided in the offset end for the purpose of positively and/or non-positively holding the second leg. By removing the safety part the second leg, because of the prevailing spring forces, can then be moved from the clearance in the first leg in order to change over to the arresting position. Here, the first leg with offset end can likewise positively secure the second leg in the arresting position, so that for the positive securing no further components are required. Obviously the mentioned protrusion can also be provided as an option, as a result of which the second leg is positively held in the arresting position twice.

With another version of the device according to the invention the arresting part is positively held in the arresting position through a means of stopping. This means of stopping for example is arranged on the bearing element or the casing of the locking device or integrated in this. With this version the arresting part tilts behind the means of stopping upon a change from the release position to the arresting position, through which the positive connection with the arresting part is created. For this purpose the arresting part has a counter means of stopping which can consist of an edge on the means of stopping. The arresting part positively held in this way likewise can only be moved from the arresting position through a destruction of the locking device. Here it is conceivable that the spring force generated by the spring acts diagonally to a (longitudinal) axis, e.g. of the bearing element, on the arresting part. Through this a tilting movement of the arresting part can be brought about at least in the region of the arresting position. In this case the arresting part can be easily displaced behind a stopping means e.g. in form of a shoulder as a result of which positive securing of the arresting part in the arresting position can be achieved. Optionally it can be provided that the tilted arresting part securely rests against a slope in the arresting position, as a result of which a concentrated contact to the bearing element is avoided and secure positioning of the arresting part in the arresting position takes place.

With a further version of the locking device it is provided that the arresting part is held in the arresting position through at least a means of engagement which is more preferably arranged directly or indirectly on the arresting part. This means of engagement mechanically interacts at least with a counter means of engagement in a positive way wherein the counter means of engagement is arranged on the casing of the locking device or on a bearing element. For instance the means of engagement can consist of a resilient plastic element which positively interacts with the counter means of engagement. Likewise, several means of engagement can be provided one after the other and/or on different sides on the arresting part which interact with corresponding counter means of engagement. Beyond this it is conceivable that the means of engagement are developed as ramp-shaped yielding shoulders which positively interact with scale-like or wedge-shaped undercuts as counter means of engagement. Thus, several means of engagement with the corresponding counter means of engagement can ensure that the arresting part definitively dwells in the arresting position. Obviously a kinematic reversal between the means of engagement and the counter means of engagement is also possible in terms of design. With this version, tilting of the arresting part for reaching the arresting position can—but not necessarily so—be omitted, so that a simple linear movement of the arresting part is adequate.

It is further conceivable that several elements accessible from the outside can also be actively connected with the arresting part. To this end, several safety parts can be employed which altogether secure the arresting part in the release position. Provided that one of the safety parts is removed this results in a relocation of the arresting part to the arresting position. For this purpose, all safety parts employed can be firmly connected with one another in their function areas.

Altogether, simple and solid designs are presented through the versions and exemplary embodiments of the locking devices according to the invention mentioned before through which the security of the locking device according to the invention can be significantly increased.

BRIEF DESCRIPTION OF THE DRAWINGS

Further measures and advantages as well as technical characteristics of the invention are obtained from the claims, the following description and the drawings. In the following figures the locking device according to the invention is presented in detail in several exemplary embodiments. It shows:

FIG. 1 a schematic sectional view of the locking device according to the invention, which is actively connected with the component essential for the function, FIG. 2a a three-dimensional view of a first version of the arresting part in an arresting position with a control element, FIG. 2b a top view of a comparable version of the arresting part from FIG. 2a in an arresting position with a control element, FIG. 3 a three-dimensional view of the most important components of the locking device according to the invention mutually actively connected, wherein the arresting part is arranged in the release position, FIG. 4a top view of a second version of a displaceably mounted arresting part with a laterally arranged ligament-shaped means of engagement, FIG. 4b top view of a similar arresting part from FIG. 4b in the arresting position, wherein the means of engagement is developed ramp-like, FIG. 5 top view of an arresting part displaceably mounted, as in FIGS. 3 and 4, however, with a means of stopping or counter means of stopping, FIG. 6a top view of a further arresting part which is held in the arresting position via a leg spring, FIG. 6b sectional view to FIG. 6a wherein the spring travel of the leg spring is shown sketched, FIG. 7a top view of an additional arresting part with a diagonally acting spring in the release position, FIG. 7b top view of the additional arresting part from FIG. 7a which is in arresting position, FIG. 8a top view of a combined arresting part (arresting part and spring) which is designed in form of a special leg spring, FIG. 8b sectional view to FIG. 8a, wherein the spring travel of the combined arresting part is shown dashed, FIG. 9 three dimensional view of the combined arresting part from FIGS. 8a and 8b and FIG. 10 three dimensional view of a further exemplary embodiment of a combined arresting part which positively secures itself in the arresting position.

DETAILED DESCRIPTION OF THE INVENTION

Figure 1:
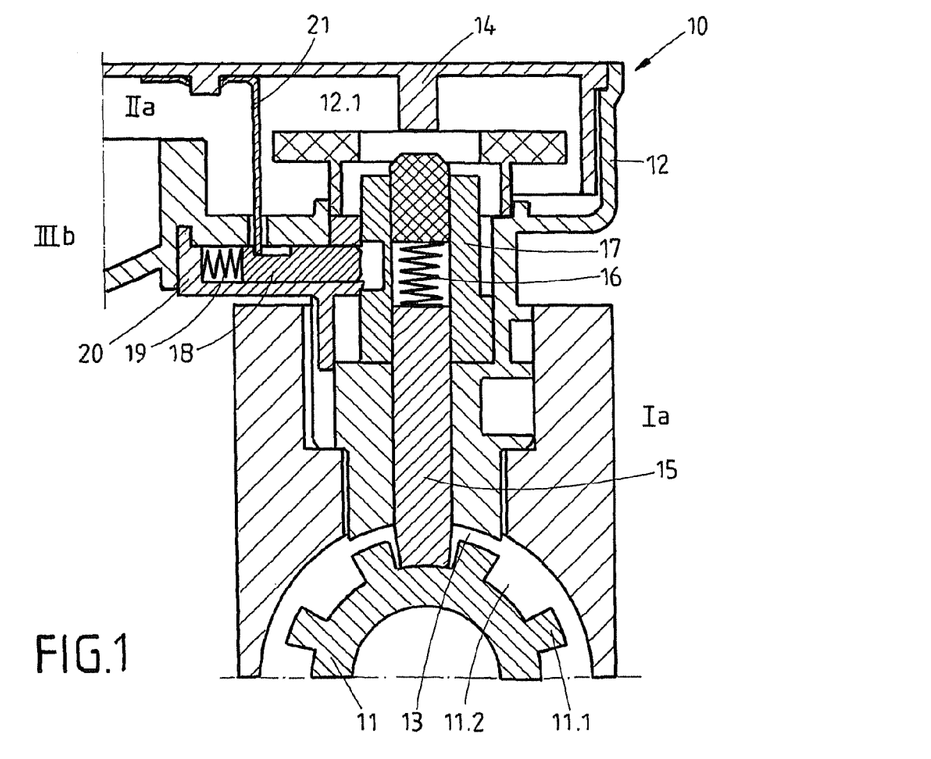

In FIG. 1 the essential part of the locking device 10 is schematically shown. Here, a component 11 essential for the function, which in the present case is designed as a steering wheel column, is blocked by way of a locking member 15 of the locking device 10. To this end, the locking member 15 is in the locking position Ia, in which it is mechanically actively connected with the component 11 essential for the function. The locking member 15 itself is displaceably arranged vertically (in the view of FIG. 1) in the locking device 10. The actual movement of the locking member 15 is brought about via the control element 17. In order for the locking member 15 not having to follow every relative movement of the control element 17, a spring element 16 is arranged between the control element 17 and the locking member 15. This spring element 16 has the task of pushing the locking member 15 in a depression 11.2 of the component 11 essential for the function provided the locking member 15 is currently pressing on a shoulder 11.1 in the locking position Ia. If the component 11 essential for the function is now turned a little, the spring 16 pushes the locking member 15 away from the control element 17 so that it reaches the depression 11.2 and thus enters into a positive connection with the component 11 essential for the function. The control element 17 itself is actuated or moved via a motor or a mechanism directly or indirectly via further components or a gearing.

The entire locking device 10 with a casing 12 is arranged in a stationary way to the component 11 essential for the function. For installation/and repair purposes the casing 12 is provided with a casing lid 14 or a closing part 14, which for example represents an element 14 accessible from the outside, through which the casing interior 12.1 becomes inaccessible.

To increase the (breaking-in) security of the present locking device 10 it is equipped with an arresting part 18. This arresting part 18 in the present case is held in the release position IIIb via a safety part 21. The safety part 21 itself consists of an angled shaped plate stamping which is permanently connected with the closing part 14. To this end, the safety part 21 can be positively, non-positively and/or materially connected with the closing part 14 with its fastening area 21.1. With the other end of the safety part 21, namely the function area 21.2 or the tip 21.2 the locking part 18 is held in the release position IIIb. For this purpose the safety part 21 with its function area 21.2 protrudes through a narrow breakthrough or slot into a recess 18.3 of the arresting part 18. Thus, the arresting part 18 is also held non-positively and/or positively in the release position IIIb through the safety part 21.

Through unauthorized or forcible opening of the casing 12 the safety part 21 with the closing part 14 is removed, as a result of which it changes from its position of rest IIa to a safety-off position IIb. This change of the position of rest IIb results in that the arresting part 18 also changes from its release position IIIb to its arresting position IIIa. For this purpose the spring element 19, which is developed as a compression spring, is provided which exerts the required spring force on the arresting part 18.

As is further evident from FIG. 1 the arresting part 18 is completely encapsulated in the casing 12 of the locking device 10. From below, the arresting part 18 is protected through an additional bearing element 20 and from the top the arresting part 18 is embedded through a part of the casing 12 proper. Only through the small break-through in the casing 12 is access to the arresting part 18 possible. If the casing 12 is improperly opened, the safety part 21 is thus moved from the position of rest IIa to the safety-off position IIb in which it is no longer actively connected with the arresting part 18. In this case the safety part 21 no longer protrudes through the breakthrough in the casing 12 either. Consequently the arresting part 18 also changes from its release position IIIb to its arresting position 111a. Since the arresting part 18 in the arresting position 111a is positively secured it is no longer possible through the upper break-through either to bring about a change of the position of the arresting part 18. Consequently the entire locking device 10 can only be destroyed completely to cancel the locking of the locking element 15 with the component 11 essential for the function.

With the exemplary embodiments shown in the FIGS. 1 to 7b the arresting part 18 acts indirectly on the locking member 15 to hold said locking member in the locking position Ia if required. For this purpose the arresting part 18 enters into a positive connection with the additionally provided control element 17 in order to thus hold the locking member 15 undisplaceably in the locking position Ia. This is obviously only the case insofar as the arresting part 18 assumes its arresting position IIIa. Provided that the arresting part 18 is arranged in the release position IIIb the normal function of the locking device 10, more preferably the locking member 15, is not influenced through the arresting part 18 so that it is also moveable in its unlocking position Ib.

Figure 2A:
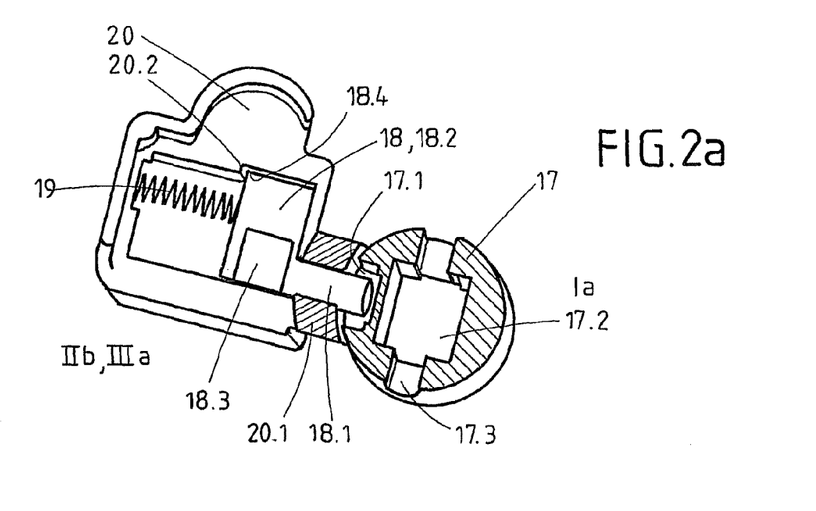

In FIG. 2a it is shown in detail how the arresting part 18 in the arresting position IIIa enters into a positive connection with a control element 17. For this purpose the arresting part 18 has a protruding pin 18.1 which brings about a positive connection with a recess 17.1 in the control element 17. Consequently the control element 17, in the position IIIa of the arresting part 18 shown, is held immovably in the locking device 10. As a result of this, the locking member 15 can no longer be moved from the locking position Ia. In the ring-shaped control element 17 a rectangular guide 17.2 is provided to accommodate the locking member 15, in which the locking member 15 itself is held displaceably. The locking member 15 can optionally be secured by way of a holding pin which is not shown in the control element 17. For this purpose a recess 17.3 can be provided in the control element 17. The mentioned locking member 15 is likewise not shown in FIG. 2. To make the existing positive connection between the arresting part 18 and the control element 17 better visible at least the control element 17 is shown in sectional drawing.

Figure 5:
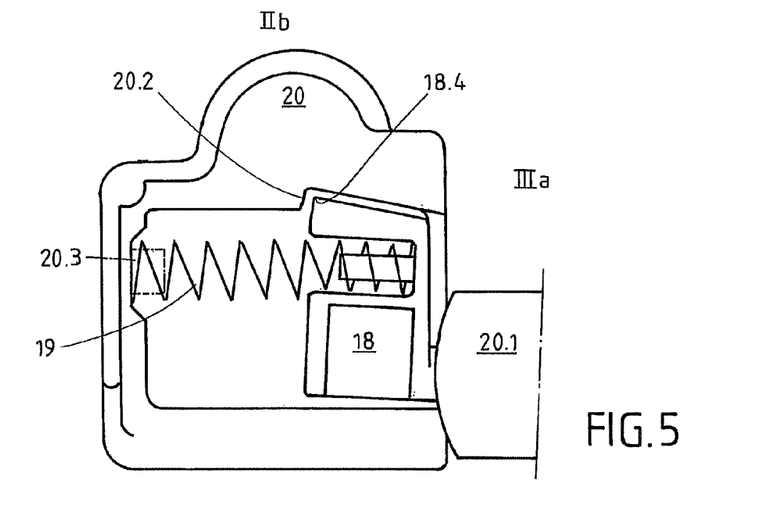

Further it is evident from FIG. 2a that the arresting part 18 is developed "L" shaped. Here, the arresting part 18 consists of the already mentioned pin 18.1 which serves for the arresting of the control element 17 and also for guiding the arresting part 18 and of the base 18.2 which additionally is provided with a recess 18.3 or a depression 18.3. The recess 18.3 serves to positively accommodate the safety part 21, more preferably the function area 21.2 in the position of rest Ha of the safety part 21 and the release position IIIb of the arresting part 18. In FIG. 2 the arresting part 18 is shown in the arresting position IIIa. Here, the arresting part 18 has been displaced against the right edge of the bearing element 20 through the spring element 19. The bearing element 20 can, with the preassembled arresting part 18, be mechanically fastened to the casing 12 of the locking device 10 through a screw connection or a rivet connection or such like. Further, the bearing element 20 has at least a means of stopping 20.2 in form of a shoulder, through which the arresting part 18 is positively held in the arresting position 111a. For this purpose the arresting part 18 proper is equipped with a counter means of stopping 18.4. This counter means of stopping 18.4 can for example be developed through a more preferably rectangular edge on the arresting part 18. In FIG. 5 the first version of a positive connection of the arresting part 18 is shown in more detail.

Figure 2B:
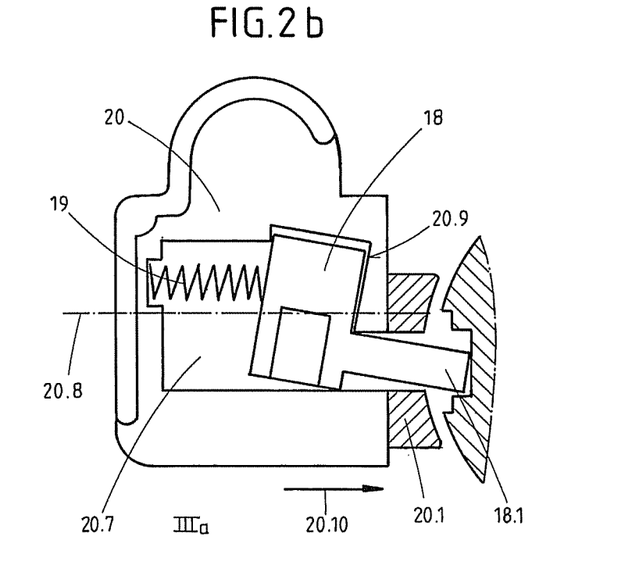

From FIG. 2b it becomes clear that the arresting part 18 is initially moved from the release position 111b in a linear manner (s. movement direction 20.10) and subsequently slightly tilted in order to reach the arresting position IIIa. In the process the arresting part 18 at the end of its space of movement 20.7 is swiveled diagonally to the longitudinal axis

20.8. In the arresting position IIIa the arresting part 18 rest with a large surface area on a slope 20.9 of the bearing element 20 provided for this purpose. In addition FIG. 2b clearly shows the play between the pin 18.1 of the arresting part 18 and the guide region 20.1 of the bearing element 20. In the arresting position IIIa the arresting part 18 is tilted behind the stopping means 20.2.

From FIG. 5 it becomes evident how a longitudinal displacement of the arresting part 18 in the bearing element 20 results in a tilting movement of the arresting part 18. Here, the arresting part 18 tilts by an angle of approximately 3° to 30°, preferably between 5° and 20°, more preferably 10°, in the bearing element 20, in order to thus obtain the desired positive connection in the arresting position IIIa. The actual longitudinal movement of the arresting part 18 is brought about by the compression spring 19. The compression spring 19 for the secure bearing on the one hand is arranged positively in an accommodation 20.3 in the bearing element 20 and, on the other hand, in a break-through of the arresting part 18. Optionally or additionally shoulders in the bearing element 20 or the arresting part 18 can engage in the coil spring 19 from the inside in order to bring about a secure position of the spring element 19 in this way. In order for the arresting part 18 to be able to tilt into its arresting position IIIa a play is provided in the bearing of the arresting part 18. In addition, the spring element 19 acts on the arresting part 18 such that it displaces the arresting part 18 behind the means of stopping 20.2. For this the contact point of the spring element 19 is located far away from the actual tilting point of the arresting part 18, wherein the contact point is arranged near the means of stopping 20.2. The tilting point of the arresting part 18 is approximately located centrally in the area of the pin 18.1. For better guidance of the arresting part 18, a guide area 20.1 is additionally provided on the bearing element 20 in order to guide the arresting part 18 via the pin 18.1 more preferably in the arresting position IIIa. In addition, the additional guide area 20.1 on the bearing element 20 also serves for the encapsulation of the arresting part 18 within the casing 12. As is evident in the shown arresting position IIIa in FIG. 5 the arresting part 18 can no longer be moved into the original release position IIIb through external influences, since this is prevented by the positive connection between the means of stopping 20.2 and the counter means of stopping 18.4. In contrast with the version of the locking device 10 from FIG. 2b no slope 20.9 is present in the bearing element 20, since the arresting part 18 in the present one is provided with a slope, as a result of which a large stopping surface is likewise created.

Figure 3:
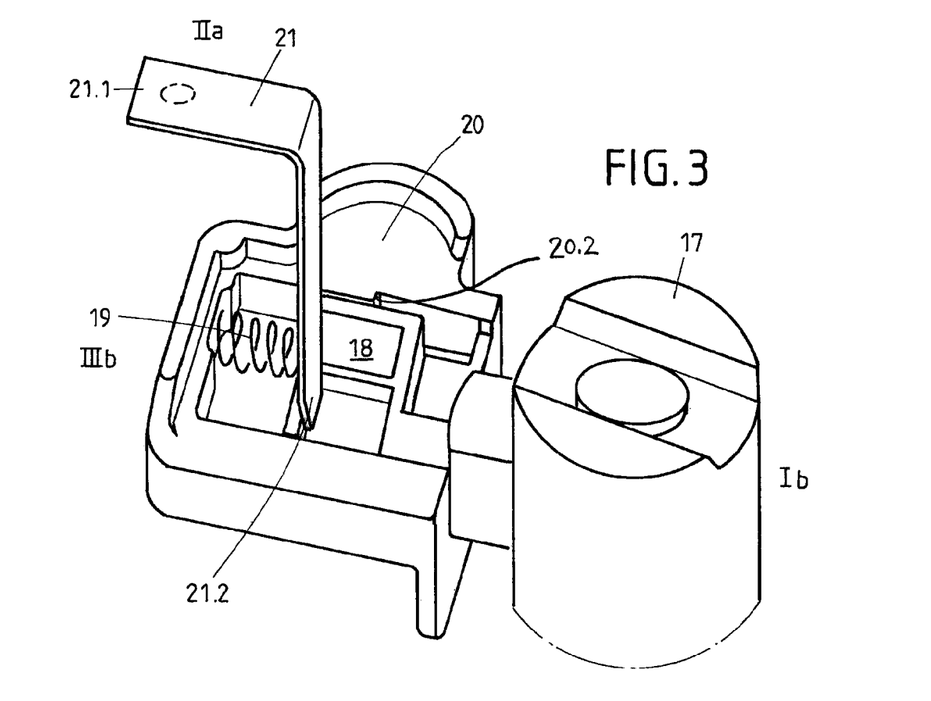

In FIG. 3 a three-dimensional schematic view of the components of the invention essential for the function is disclosed. For improved overview, the presentation of the casing 12 and the element 14 accessible from the outside was omitted. The safety part 21, which is connected with the element 14 accessible from the outside which is not shown, is presented in its position of rest IIa. Here, it holds the arresting part 18 in the release position 111*b* so that the locking member 15 can be freely actuated by way of the control element 17. In FIG. 3 the first version of the positive connection with the means of stopping 20.2 is shown. The exact function has already been described with the FIGS. 2 and 5. From FIG. 3 it becomes clear which sequence of movements takes place insofar as the safety part 21 is transferred from the position of rest IIa to the safety-off position IIb. In this case the positive connection between the tip 21.2 of the safety part 21 and the arresting part 18, more preferably the recess 18.3 is cancelled so that the spring element 19 moves the arresting part 18 into the arresting position IIIa. By means of FIG. 3 it is clearly visible how the arresting part 18 is surrounded in an encapsulated way through the lateral walls of the bearing element 20. In order to securely arrange the bearing element 20 on or in the casing 12 the arch-shaped area for mounting is provided.

Figure 4A:
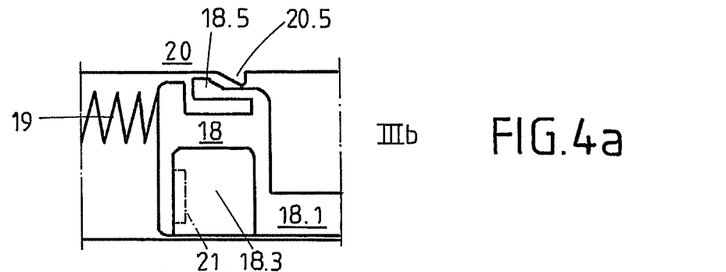
Figure 4B:
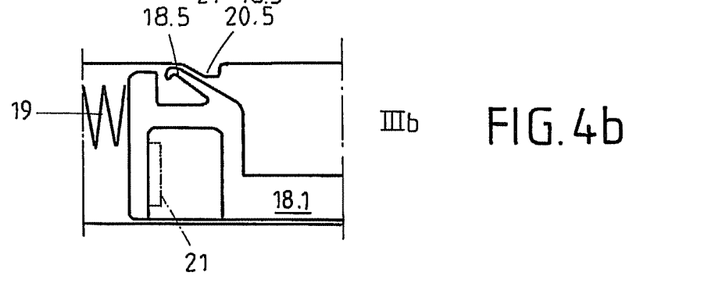

In the FIGS. 4a and 4b is shown the second version for forming the positive connection for holding the arresting part 18 in the arresting position IIIa. In both Figures (FIGS. 4a and 4b) the respective arresting part 18 is shown in the release position IIIb. The safety part 21 in the position of rest IIa is also drawn-in dashed. Through the removal of the safety part 21 the arresting part 18 is longitudinally displaced in the bearing element 20 through the compression spring 19 provided. Here, a means of engagement 18.5 slides along a counter means of engagement 20.5 of the bearing element 20 until it comes to lie behind the counter means of engagement 20.5. Obviously, several means of engagement 18.5 one after the other or on the left and right sides on the arresting part 18 can act together with the corresponding counter means of engagement 20.5 of the bearing element 20. The counter means of engagement 20.5 shown consists of a wedge-type shoulder or ramp-type shoulder along which the ligament-type means of engagement 18.5 developed in a flexible way can slide with an inclined guide surface. Here, the yielding or resilient means of engagement 18.5 is pressed in order to pass the wedge-shaped shoulder 20.5. As soon as the means of engagement 18.5 has passed the shoulder 20.5 it springs back again to the outside and forms a permanent positive connection for the secure attachment of the arresting part 18 in the arresting position IIIa. It must be mentioned at this point that the counter means of engagement 20.5 and means of engagement 18.5 can obviously also be developed in reversed kinematics to each other. It is also conceivable that the means of engagement 18.5 consists of a plastic part which is mounted to the arresting part 18. As already mentioned, the entire arresting part 18 can also consist of a moulded plastic part. In FIG. 4b an arch-shaped or barb-type means of engagement 18.5 is used which otherwise has the same function as the means of engagement 18.5 from FIG. 4a.

Figures 6A, 6B:
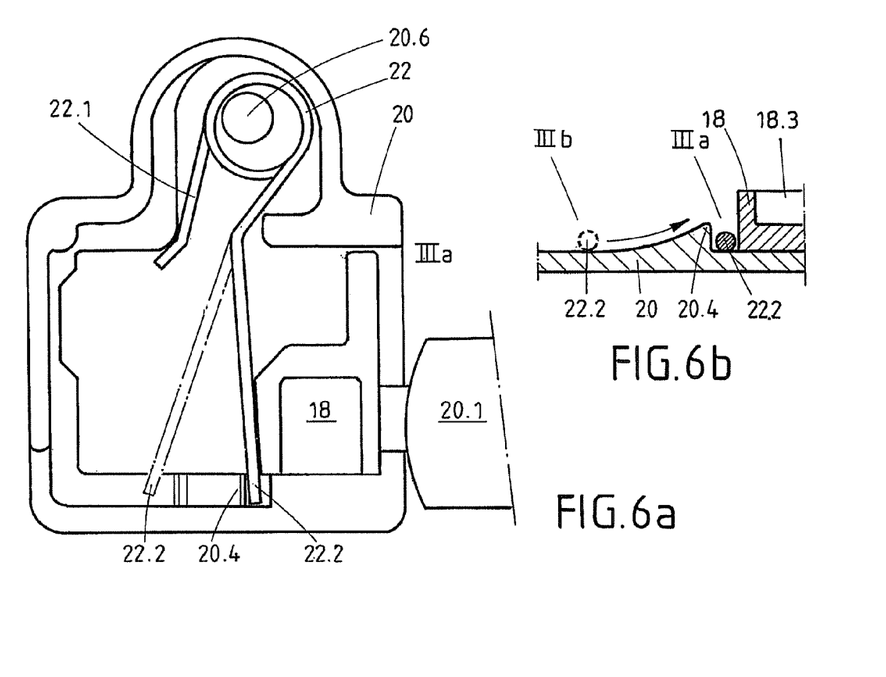

In FIGS. 6a and 6b is shown a third version for the positive connection of the arresting part 18. Here, a leg-shaped spring 22 is used which for example is fixed in the bearing element 20 via a holding pin 20.6. This holding pin 20.6 can be realized also through a holding screw for the attachment of the bearing element 20. The mentioned leg spring 22 likewise ensures a longitudinal displacement of the arresting part 18 in the bearing element 20. With this version the arresting part 18 does not directly enter into a positive connection with the bearing element 20 but the positive connection is formed by way of the leg spring 22. The leg spring 22 itself has a first leg 22.1 and a second leg 22.2. The first leg 22.1 firmly rests against the bearing element 20. Here, the first leg 22.1 can be designed shorter. The second leg 22.2 in contrast is designed longer in order to be able to correspond with the arresting part 18. In the dashed presentation of the leg 22.2 the arresting part 18 is also located in the release position IIIb in which it is held by the safety part 21. Once the safety part 21 is removed, the second leg 22.2 pushes the arresting part 18 into the arresting position IIIa. In the process, the second leg 22.2 with its end runs over a ramp-shaped shoulder 20.4 which is arranged on or integrated in the bearing element 20. In the sectional view from FIG. 6b an offset section, which runs parallel to the lower edge of the bearing element 20, is shown. The position of the second leg 22.2 in the release position 111*b* of the arresting part 18 and the arresting position 111*a* are also indicated. As becomes clear from FIG. 6b the arresting part 18 can no longer be displaced from the arresting position IIIa to its original release position IIIb since the second leg 22.2 is positively arranged behind the ramp-shaped shoulder 20.4.

Figure 7A:
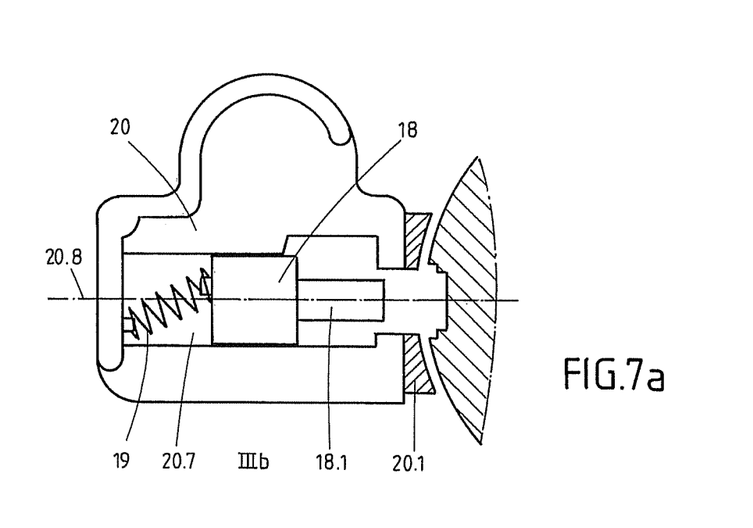
Figure 7B:
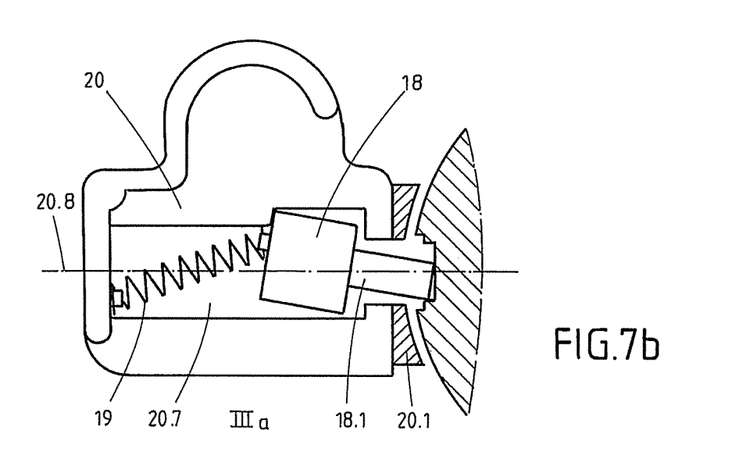

The last FIGS. 7a and 7b show a fourth version of the locking device 10 according to the invention on the one hand in the release position IIIB (s. FIG. 7a) and on the other hand in the arresting position IIIa (s. FIG. 7b), where the arresting part 18 and the bearing part 20 are designed in a space-saving manner. To this end the space of movement 20.7 was minimized in that a clearly narrower arresting part 18 than with the other versions is employed. Obviously this narrow design can also be transferred to the remaining versions. In addition the spring element 19, which is present in form of a compression spring 19, acts on the arresting part 18 diagonally to the axis 20.8, as a result of which the tilting movement into the arresting position IIIa is achieved. The length of the travel of the arresting part 18 can likewise be minimized, as a result of which space can be additionally saved. Obviously the present version can also be equipped with a stopping slope 20.9 on the bearing element 20.

Figures 8A, 8B:
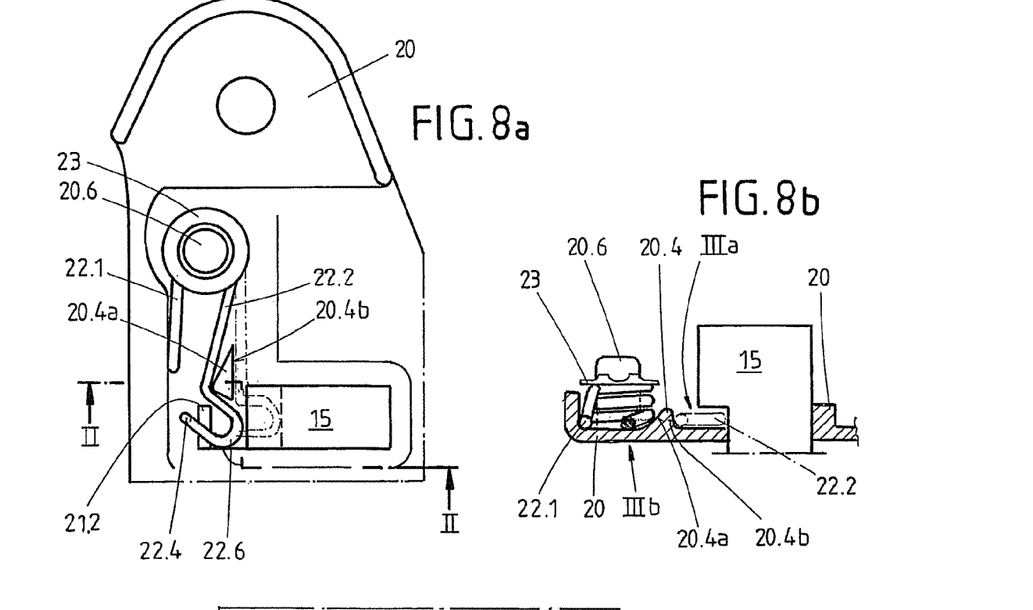
Figure 9:
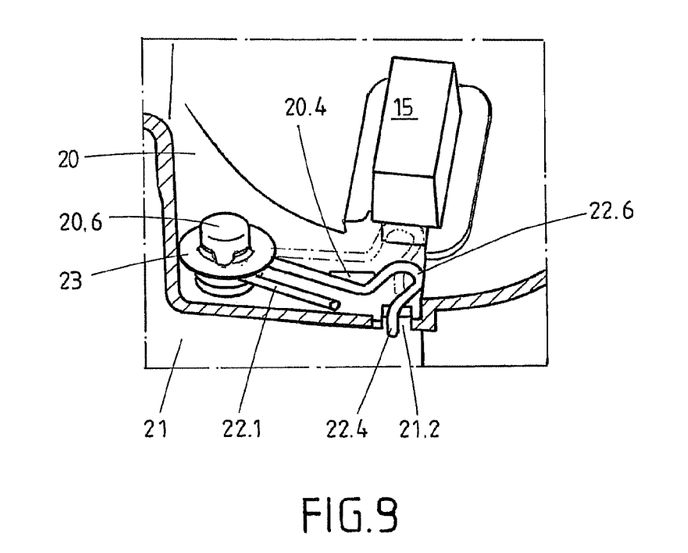
Figure 10:
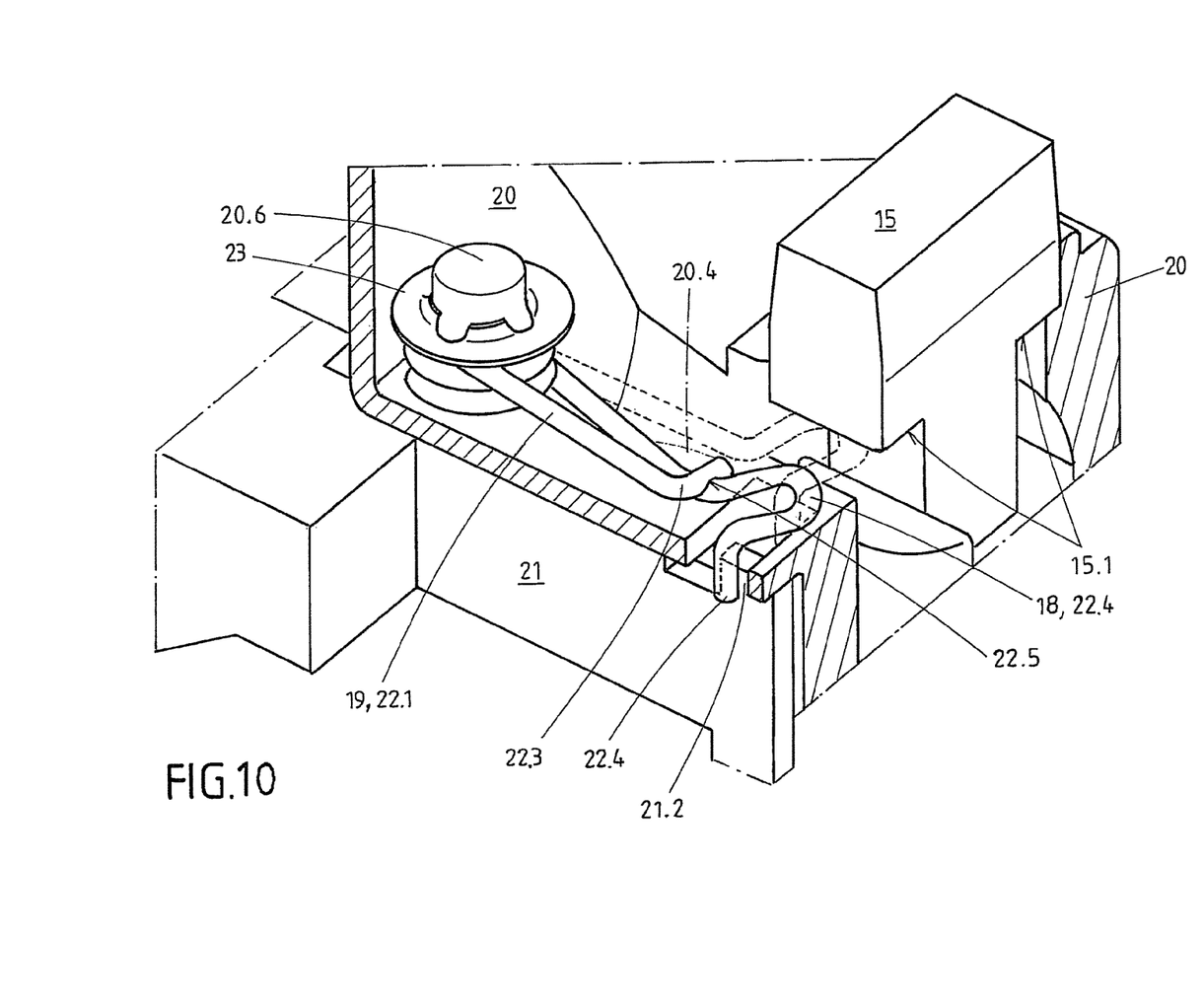

FIGS. 8a and 8b show a further embodiment of the invention. Here, the arresting part 18 is combined with the spring 19 in such a manner that it is embodied in one piece and/or the same material. Here, the spring 19 is itself designed as leg spring 22 and comprises a first leg 22.1 and a second leg 22.2. With the first leg 22.1 the combined arresting part 18, 19 braces itself on the bearing element 20 or the casing interior 12.1 in order to be able to thus transmit the required spring force to the second leg 22.2. The second leg 22.2 serves for the direct securing of the locking member 15 in the arresting position 111a, in contrast with the other embodiments of the present invention. To this end, the second leg 22.2 for example comprises the arc-shaped protrusion 22.6 shown. It is likewise conceivable to arrange a comparable cam on the second leg 22.2 which positively interacts with the locking member 15. The locking member 15 in FIG. 8 to 10 is shown in its locking position 1a. In addition the locking member 15 has a shoulder 15.1 or a depression 15.1 which the second leg 22.2 of the combined arresting part 18, 19 can enter in a positive manner. In addition, the combined arresting part 18, 19 is shown in FIG. 8 to 10 in both the release position IIIb and in the arresting position IIIa—there, however, only dashed. The safety part 21 which is likewise present is arranged in the position of rest IIa in each of the FIGS. 8 to 10.

FIG. 8a additionally shows a protrusion 20.4 which is provided on the bearing element 20 ramp-shaped or wedge-like. This protrusion 20.4 has a sliding region 20.4a and a holding region 20.4b. The sliding region 20.4a is designed wedge or ramp-like (see FIG. 8b) so that the second leg 22.2 of the combined arresting part 18, 19 can easily slide over said sliding region from the release position 111b in order to change to the arresting position 111a. Once the second leg 22.2 has reached the end of the sliding region 20.4a (see maximum elevation or tip of protrusion of 20.4 in FIG. 8b), the second leg 22.2 slides down parallel to the holding region 20.4b and comes to rest on the bearing element 20. From this arresting position IIIa, in which the combined arresting part 18, 19 interacts positively with the locking member, the second leg 22.2 can no longer be moved back in order to obtain the release position 111b, since the holding region 20.4b positively holds the second leg 22.2 in the arresting position IIIa. The holding region 20.4a is substantially oriented orthogonally to the surface of the bearing element 20, on which the second leg 22.2 comes to rest in the arresting position IIIa.

As is clearly visible from FIG. 8b and FIG. 9, the second leg 22.2 with its arc-shaped protrusion 22.6 positively interacts with a shoulder or a depression 15.1 in the locking member 15, so that the locking member 15 itself can no longer be transferred from the locking position Ia to the unlocking position Ib. To increase the strength of the present locking device 10 the locking member 15 is surrounded with an almost closed reinforcement rim, which is formed by the bearing element 20. Only in the operational region of the protrusion 22.6 of the second leg 22.2 is this reinforcement rim interrupted. In the shown section from FIG. 8b, the reinforcement rim in the bearing element 20 is clearly visible on the right next to the locking member 15.

FIG. 10 shows a further exemplary embodiment of the invention with a combined arresting part 18, 19. For improved clarity the bearing element 20 was shown in part section in order to render the technical details of the special leg spring 22 (which forms the combined arresting part 18, 19) visible. With the present version the second leg 22.2 is positively secured in the arresting position 111a through an offset end 22.3 of the first leg 22.1 Thus, the present combined arresting part 18, 19 secures itself positively in the arresting position IIIa. Optionally the already mentioned protrusion 20.4 can be provided for securing the combined arresting part 18, 19 in the arresting position IIIa.

In the release position IIIb the second leg 22.2 of the combined arresting part 18, 19 is held by the offset end 22.4, which positively interacts with the operating region 21.2 of the safety part 21. This safety part 21 holds the combined arresting part 18, 19 from below—in contrast with the exemplary embodiment from FIG. 3, which acts from the top—in the release position IIIb. If the safety part 21 is now removed, which in the present case from FIG. 10 takes place through a downward movement, the second leg 22.2 automatically pushes itself into the arresting position 111a from the release position 111b. In order for there being space provided in the bearing element 20 for the offset end 22.4 of the second leg 22.2 a generous clearance or perforation is provided. In the release position IIIb the second leg 22.2 lies under the first leg 22.1, wherein a recess (22.5) can be additionally provided in the offset end 22.3 of the first leg 22.1. Once the second leg 22.2 has moved from the release position IIIb into the arresting position IIIa it can no longer be moved back into the release position IIIb since it abuts the vertically cut-off end 22.3 of the offset first leg 22.1.

Optionally to the exemplary embodiment from FIG. 10 the second leg 22.2 can also have a comparable recess 22.5, whereas the first leg 22.1 can be embodied without a recess 22.5. The shown recess 22.5 can also be completely omitted as a result of which the operation of the combined arresting part 18, 19 is not impaired. In addition, the protrusion 20.4 can also be arranged, which accordingly is shown dashed in FIG. 10.

The combined arresting part 18, 19 designed as leg spring 22 is arranged in the bearing element 20 by way of the already mentioned holding pin 20.6. In order for the special leg spring 22 to be securely held on the bearing element 20, a holding means 23 in form of a locking washer, a clamping ring, a nut or the like can be additionally provided on the holding pin 20.6. Through this additional holding means 23 the special leg spring 22 can be securely positioned on the bearing element 20 in a positive and/or non-positive manner.

It is likewise conceivable that the second leg 22.2 of the leg spring 22 is pressed down in the release position IIIb by the first leg 22.1. To this end, the first leg 22.1 can be embodied angled-off in such a manner that it comprises a region which is substantially embodied parallel to the base of the bearing element 20, on which the second leg 22.2 rests or over which the second leg 22.2 is guided. This parallel region of the first leg 22.1 can be utilized in order to press down the second leg 22.2 so that unintentional arresting of the locking member 15 through the combined arresting part 18, 19, more preferably the second leg 22.2 of the leg spring 22, is securely avoided even through shocks, vibrations or other external influences. Here, it is furthermore conceivable that the end 22.3 of the first leg 22.1 is additionally utilized in order to brace itself behind a recess or a shoulder (e.g. of the bearing element 20), so that the first leg 22.1—as already mentioned—with the parallel region, secures and/or reliably presses down the second leg 22.2 in the release position IIIb, even if the material of the leg spring 22 should fatigue after years and the spring force should diminish in this event. Generally the spring force of the spring element 19 or the leg spring 22 is designed in such a manner that it always reliably transfers the (active) second leg 22.2 from the release position IIIb to the arresting position IIIa when the safety part 21 is removed from the rest position IIa. If the combined arresting part 18, 19 should now be triggered so that it changes from the release position IIIb to the arresting position IIIa the second leg 22.2 moves behind the parallel region of the first leg 22.1 and can be positively held in the arresting position IIIa through an existing shoulder in the end 22.3 of the first leg 22.1 which can be created through a further angling-off of the leg 22.1. With this version, too, the protrusion 20.4 (see FIG. 8a-10) can be additionally provided in order to not only positively arrest the second leg 22.2 of the leg spring 22 through the first leg 22.1 but also additionally through the protrusion 20.4. It is also possible that only the protrusion 20.4 is provided in order to positively arrest the second leg 22.2. In this case additional angling-off of the leg 22.1 can be omitted.

Finally it must be mentioned that the exemplary embodiments and versions of the locking device 10 according to the invention shown here, more preferably can be combined with one another in any way for the positive arresting of the arresting part 18 in the arresting position IIIa provide these do not explicitly exclude themselves.

The invention claimed is:

1. A locking device for the locking and/or unlocking of a component essential for the function of a vehicle with
 a casing adapted to fasten the locking device to the component essential for the function, and
 a moveable locking member, which can assume at least two positions, namely
  a locking position in which the locking member protrudes from the casing through an opening and is actively connected with the component essential for the function and
  an unlocking position, in which the locking member is not actively connected with the component essential for the function, and
 an arresting part, which in an arresting position arrests the locking member in the locking position only when the locking device is opened without authorization, wherein the arresting part is positively held in the arresting position behind a bearing element.

2. The locking device according to claim 1, wherein the arresting part mechanically interacts in the arresting position directly with the locking member or indirectly via a control element which actuates the locking member.

3. The locking device according to claim 1, wherein at least an element partially accessible from the outside of the locking device is present which mechanically interacts with the arresting part such that upon unauthorized removal of the element the arresting part assumes an arresting position to hold the locking member in the locking position.

4. The locking device according to claim 3, wherein the element comprises a locking cylinder, a closing part, or an electrical connection contact.

5. The locking device according to claim 3, wherein the element at least mechanically interacts with the arresting part via a safety part, wherein the element holds the safety part in a position of rest (IIa) provided that the element is located in an arrangement conditional through its usage and the safety part in the position of rest (IIa) holds the arresting part in a release position (IIIb) in which the locking member is moveably arranged in the casing and
 wherein unauthorized removal of the element results in that the safety part is transferred from the position of rest (IIa) to a safety-off position (IIb) as a result of which the arresting part changes from the release position (IIIb) to the arresting position (IIIa) as a result of which the locking member is arrested in the locking position (Ia).

6. The locking device according to claim 5, wherein the safety part is integrated with the element.

7. The locking device according to claim 5, wherein the safety part is developed as a safety plate or a safety wire.

8. The locking device according to claim 1, wherein the arresting part is subjected to a spring force by a spring, as a result of which a change from the release position to the arresting position takes place in the event that the locking device is opened without authorization.

9. The locking device according to claim 8, wherein the arresting part is part of the spring, as one piece and/or of the same material, as a result of which an independent change of a combined arresting part from the release position (IIIb) to the arresting position (IIIa) is achievable.

10. The locking device according to claim 8, wherein the arresting part is part of the spring, as one piece and/or of the same material, as a result of which an independent change of a combined arresting part from the release position (IIIb) to the arresting position (IIIa) is achievable and a combined arresting part is positively held in the arresting position (IIIa) through a protrusion, wherein the protrusion more preferably comprises a sliding region and a holding region.

11. The locking device according to claim 8, wherein the arresting part is part of the spring, as one piece and/or of the same material, as a result of which an independent change of a combined arresting part from the release position (IIIb) to the arresting position (IIIa) is achievable and a combined arresting part comprises at least a first leg and a second leg, wherein the second leg arrests the locking member in the locking position and the first leg positively holds the second leg in the arresting position.

12. The locking device according to claim 1, wherein the arresting part in the arresting position positively interacts with a means of stopping.

13. The locking device according to claim 12, wherein the arresting part when changing from the release position to the arresting position is displaced behind the means of stopping and positively interacts with a counter means of stopping of the arresting part.

14. The locking device according to claim 12, wherein the means of stopping is connected with the casing or forms a part of the casing.

15. The locking device according to claim 1, wherein the arresting part is displaceably held in a bearing element further including a guide area.

16. The locking device according to claim 1, wherein the arresting part in the arresting position is held through at least a means of engagement, which is arranged on the arresting part, and positively interacts with at least a counter means of engagement.

17. The locking device according to claim 16, wherein the means of engagement are developed as ramp-shaped shoulders.

18. The locking device according to claim 8, wherein the arresting part by means of the spring force is capable of being tilted to a direction of movement at least in a region of the arresting position.

19. The locking device according to claim 8, wherein the arresting part by means of the spring force is capable of being tilted to a direction of movement at least in the region of the arresting position (IIIa) and at least a part of the spring force acts on the arresting part to tilt the arresting part around an axis of a space of movement.

20. The locking device according to claim 8, wherein the arresting part by means of the spring force is capable of being tilted to a direction of movement at least in the region of the arresting position (IIIa) and a slope is arranged at one end of a space of movement of the arresting part.

21. A locking device for the locking and/or unlocking of a component essential for the function of a vehicle with
a casing adapted to fasten the locking device to the component essential for the function, and
a moveable locking member, which can assume at least two positions, namely
a locking position in which the locking member protrudes from the casing through an opening and is actively connected with the component essential for the function and
an unlocking position, in which the locking member is not actively connected with the component essential for the function, and
an arresting part, which in an arresting position arrests the locking member in the locking position only when the locking device is opened without authorization,
wherein a second leg of a spring is positively held behind a protrusion.

22. The locking device according to claim 21, wherein the arresting part mechanically interacts in the arresting position directly with the locking member or indirectly via a control element which actuates the locking member.

23. The locking device according to claim 21, wherein at least an element partially accessible from the outside of the locking device is present which mechanically interacts with the arresting part such that upon unauthorized removal of the element the arresting part assumes an arresting position to hold the locking member in the locking position.

24. The locking device according to claim 23, wherein the element comprises a locking cylinder, a closing part, or an electrical connection contact.

25. The locking device according to claim 23, wherein the element at least mechanically interacts with the arresting part via a safety part,
wherein the element holds the safety part in a position of rest (IIa) provided that the element is located in an arrangement conditional through its usage and the safety part in the position of rest (IIa) holds the arresting part in a release position (IIIb) in which the locking member is moveably arranged in the casing and
wherein unauthorized removal of the element results in that the safety part is transferred from the position of rest (IIa) to a safety-off position (IIb) as a result of which the arresting part changes from the release position (IIIb) to the arresting position (IIIa) as a result of which the locking member is arrested in the locking position (Ia).

26. The locking device according to claim 25, wherein the safety part is integrated with the element.

27. The locking device according to claim 25, wherein the safety part is developed as a safety plate or a safety wire.

28. The locking device according to claim 21, wherein the arresting part is subjected to a spring force by a spring, as a result of which a change from the release position (IIIb) to the arresting position (IIIa) takes place in the event that the locking device is opened without authorization.

29. The locking device according to claim 28, wherein the arresting part is part of the spring, as one piece and/or of the same material, as a result of which an independent change of a combined arresting part from the release position (IIIb) to the arresting position (IIIa) is achievable.

30. The locking device according to claim 28, wherein the arresting part is part of the spring, as one piece and/or of the same material, as a result of which an independent change of a combined arresting part from the release position (IIIb) to the arresting position (IIIa) is achievable and a combined arresting part is positively held in the arresting position (IIIa) through a protrusion, wherein the protrusion more preferably comprises a sliding region and a holding region.

31. The locking device according to claim 28, wherein the arresting part is part of the spring, as one piece and/or of the same material, as a result of which an independent change of a combined arresting part from the release position (IIIb) to the arresting position (IIIa) is achievable and a combined arresting part comprises at least a first leg and a second leg, wherein the second leg arrests the locking member in the locking position and the first leg positively holds the second leg in the arresting position.

32. The locking device according to claim 21, wherein the arresting part in the arresting position positively interacts with a means of stopping.

33. The locking device according to claim 32, wherein the arresting part when changing from the release position to the arresting position is displaced behind the means of stopping and positively interacts with a counter means of stopping of the arresting part.

34. The locking device according to claim 32, wherein the means of stopping is connected with the casing or forms a part of the casing.

35. The locking device according to claim 21, wherein the arresting part is displaceably held in a bearing element, further including a guide area.

36. The locking device according to claim 21, wherein the arresting part in the arresting position is held through at least a means of engagement, which is arranged on the arresting part, and positively interacts with at least a counter means of engagement.

37. The locking device according to claim 36, wherein the means of engagement are developed as ramp-shaped shoulders.

38. The locking device according to claim 28, wherein the arresting part by means of the spring force is capable of being tilted to a direction of movement at least in a region of the arresting position.

39. The locking device according to claim 28, wherein the arresting part by means of the spring force is capable of being tilted to a direction of movement at least in the region of the arresting position (IIIa) and at least a part of the spring force acts on the arresting part to tilt the arresting part around an axis of a space of movement.

40. The locking device according to claim 28, wherein the arresting part by means of the spring force is capable of being tilted to a direction of movement at least in the region of the arresting position (IIIa) and a slope is arranged at one end of a space of movement of the arresting part.

* * * * *